United States Patent [19]

Okuzono et al.

[11] Patent Number: 4,753,658
[45] Date of Patent: Jun. 28, 1988

[54] ERASABLE INK: SULPHONATED RUBBER DYED WITH BASIC DYE AND DISSOLVED IN ORGANIC SOLVENT

[75] Inventors: Shuichi Okuzono; Tatsushi Nakagawa, both of Shinnanyo; Takashi Shintani, Tokuyama, all of Japan

[73] Assignee: Toyo Soda Manufacturing Co., Ltd., Shinnanyo, Japan

[21] Appl. No.: 73,860

[22] Filed: Jul. 14, 1987

Related U.S. Application Data

[63] Continuation of Ser. No. 789,122, Oct. 18, 1985, abandoned.

[30] Foreign Application Priority Data

Oct. 24, 1984 [JP]  Japan ................. 59-221953

[51] Int. Cl.⁴ ................. C09B 69/10; C09D 11/18
[52] U.S. Cl. ................. 8/513; 8/514; 8/654; 8/655; 8/657; 8/659; 106/22; 260/DIG. 38
[58] Field of Search ............ 8/513, 514, 654, 657; 106/22

[56] References Cited

U.S. PATENT DOCUMENTS

| | | | |
|---|---|---|---|
| 2,400,720 | 5/1946 | Staudinger et al. | 8/474 |
| 3,145,073 | 8/1964 | Gagliardi | 8/513 |
| 3,148,017 | 9/1964 | Gagliardi | 8/513 |
| 3,179,486 | 4/1965 | Dammicci | 8/493 |
| 3,920,855 | 11/1975 | Dawson et al. | 426/250 |
| 4,256,494 | 3/1981 | Yamamoto et al. | 524/277 |
| 4,297,260 | 10/1981 | Ferree et al. | 524/292 |
| 4,516,978 | 5/1985 | Goto et al. | 8/510 |

FOREIGN PATENT DOCUMENTS

| | | |
|---|---|---|
| 3230463 | 2/1984 | Fed. Rep. of Germany . |
| 54-007931 | 2/1979 | Japan . |
| 58-208358 | 12/1983 | Japan . |

*Primary Examiner*—A. Lionel Clingman
*Attorney, Agent, or Firm*—Cushman, Darby & Cushman

[57] ABSTRACT

Disclosed is a coloring material including a rubber having a sulfonic acid group or a salt thereof, which is dyed with a basic dye. The coloring material is prepared by adding a solution of an alkali in an alcohol to a solution of a chlorosulfonated polyolefin in an organic solvent and then adding a basic dye to the obtained reaction liquid, or adding a basic dye to a solution of a sulfonated product of a rubber in an organic solvent, and optionally removing the solvent from the obtained solution.

16 Claims, No Drawings

ERASABLE INK: SULPHONATED RUBBER DYED WITH BASIC DYE AND DISSOLVED IN ORGANIC SOLVENT

This is a continuation of application Ser. No. 789,122, filed Oct. 18, 1985 which was abandoned upon the filing hereof.

BACKGROUND OF THE INVENTION

1. Field of the Invention

The present invention relates to a coloring material having an elasticity and a process for the preparation thereof.

Coloring materials having an elasticity are used in various fields of coloring materials as, for example, bases of paints and inks, and, in particular, the elasticity and the characteristic that the polymer per se is colored of coloring materials of this type make them valuable for use as bases of inks giving erasable written letters or figures.

2. Description of the Related Art

As the ink composition giving letters or figures written on paper by a ball pen or the like which can be easily erased by a rubber eraser within a certain time, there is known a composition comprising a dye or pigment, a solvent-soluble polymer, water or an organic solvent, and other additives. A polymer having an elasticity, that is, rubber, is effectively used as the solvent-soluble polymer. As the rubber-containing coloring composition, there are known a composition comprising a natural rubber or isoprene rubber, a pigment, a low-boiling-point rubber solvent, and other additives (Japanese Unexamined Patent Publication No. 58-208358); a writing liquid comprising a latex including an uncarboxylated styrene/butadiene rubber and a 2-chlorobutadiene polymer and/or vinyl pyridine/styrene/butadiene rubber, and a dye (Japanese Unexamined Patent Publication No. 59-49276); a composition comprising a carboxylated styrene/butadiene copolymer latex and a triarylmethane dye (Japanese Unexamined Patent Publication No.56-131679); and a reaction product of a dye with an addition reaction product of an ethylene-propylene-diene terpolymer (EPDM) and an $\alpha,\beta$-ethylenically unsaturated carboxylic acid (Japanese Unexamined Patent Publication No. 54-17931).

When a pigment is used as taught in Japanese Unexamined Patent Publication No. 58-208358, it is difficult to stably disperse the pigment, the long-term storability is poor, and ink is readily blurred. If a dye is used as taught in Japanese Unexamined Patent Publication No. 59-49276, to moderate these defects, since the dye is merely dispersed in the elastic polymer as the binder, the dye is likely to permeate into paper and the color remains on the paper surface even though an attempt is made to erase written letters or figures. As means for overcoming this defect, there can be mentioned the processes proposed in Japanese Unexamined Patent Publication No. 56-131679 and Japanese Unexamined Patent Publication No. 54-17931. In the former process, the light resistance is insufficient because the linkage is formed between the carboxyl group and the dye, and in the latter process, the manufacturing steps are complicated because the unreacted dye must be removed.

SUMMARY OF THE INVENTION

It is a primary object of the present invention to provide a novel coloring material having an elasticity, especially a coloring material having an elasticity which is advantageously used as a base of an ink providing erasable written letters or figures and which does not have the problems of writing smoothness, storability, erasability, and light resistance involved in the conventional techniques.

In accordance with one aspect of the present invention, there is provided a coloring material comprising a rubber having a sulfonic acid group or a salt thereof, which is dyed with a basic dye.

In accordance with another aspect of the present invention, there is provided a process for the preparation of coloring materials, which comprises adding a solution of an alkali in an alcohol to a solution of a chlorosulfonated polyolefin in an organic solvent and adding a basic dye to the thus obtained reaction liquid, or adding a basic dye to a solution of a sulfonated product of a rubber, and optionally removing the solvent from the thus obtained colored solution.

The coloring material of the present invention comprises a rubber dyed with a basic dye, and this colored rubber has the characteristics of color abundance and sharpness inherent to basic dyes. Moreover, the colored rubber not only acts as a binder but also exerts a part of the color function. This colored rubber is valuable as a base of a paint or ink, especially as a base of an ink providing erasable written letters or figures.

DESCRIPTION OF THE PREFERRED EMBODIMENTS

The term "rubber" used in the instant specification indicates not only a solid elastomer but also a rubber component in a solution formed by dissolving the solid elastomer in a solvent.

The coloring material having an elasticity according to the present invention can be prepared by adding a basic dye to a solution of a rubber having a sulfonic acid group or a salt thereof in an organic solvent to dye the rubber.

As the rubber having a sulfonic acid group or a salt thereof, there can be mentioned, for example, a reaction product of a chlorosulfonated polyolefin with an alkali and a sulfonated product of a rubber. By the term polyolefin are meant homopolymers and copolymers of olefins. For example, there can be mentioned medium-pressure polyethylene, low-pressure polyethylene, high-pressure polyethylene, linear low-density polyethylene, an ethylene/vinyl acetate copolymer, an ethylene/propylene copolymer, an ethylene/butene-1 copolymer, and an ethylene/ethyl acrylate copolymer.

The chlorosulfonated polyolefin referred to in the present invention is obtained by reacting a polyolefin as mentioned above with chlorine and sulfur dioxide gas, with chlorine and sulfuryl chloride, or with sulfuryl chloride alone, and the prepapation process is not particularly critical. The sulfonated product of the rubber is prepared by reacting a rubber with a sulfonating agent such as acetyl sulfate or a complex of sulfur trioxide with triethyl phosphate. The preparation process is not particularly critical. For example, there can be mentioned sulfonated products of an isoprene rubber, a styrene/butadiene rubber, a butadiene rubber, a nitrile rubber, and an ethylene/propylene rubber.

In order to impart a sufficient erasability to a base of an ink providing erasable written letters or figures, it is preferred that the Mooney viscosity of the rubber be 20 to 70 and, when the base is used in the form of an ink, the viscosity be such that one ink is smoothly extruded from the pen point, that is, 5 to 100 poises. If the Mooney viscosity of the rubber is lower than 20, the applied ink is likely to adhere to paper and the erasability by a rubber eraser is degraded. If the Mooney viscosity of the rubber is higher than 70, the viscosity of the ink is too high and the ink cannot be smoothly extruded from the pen point.

In the present invention, when a chlorosulfonated polyolefin is used, the chlorosulfonated polyolefin is first reacted with an alkali to convert the chlorosulfone group to a sulfonic acid group. The reaction of the chlorosulfonated polyolefin with the alkali is carried out by adding an alcohol solution of the alkali to a solution of the chlorosulfonated polyolefin in an organic solvent with stirring. The alcohol is necessary not only for dissolving the alkali but also for uniformly dissolving the reaction product between the chlorosulfonated polyolefin and the alkali. As the alcohol, there are preferably used lower alcohols such as methanol, ethanol, n-propanol, isopropanol, n-butyl alcohol, sec-butyl alcohol, tert-butyl alcohol, isobutyl alcohol, ethylene glycol, diethylene glycol, propylene glycol, and glycerol. In order to promote the reaction, it is preferred that the reaction temperature be high, i.e., at least 50° C.; to increase the conversion, it is preferred that the alkali be used in an amount of at least 2 moles, especially 2.5 to 3.5 moles, per mole of the chlorosulfonic group of the chlorosulfonated polyolefin. If the amount of the alkali is smaller than 2 moles per mole of the chlorosulfone group, the conversion is low. If the amount of the alkali is larger than 3.5 moles per mole of the chlorosulfone group, a large amount of the alkali remains unreacted. If the alkali is used in an excessive amount, after termination of the reaction, an acid such as formic acid, acetic acid, butyric acid, tartaric acid or malic acid can be added to neutralize the unreacted alkali, whereby a reaction product between the chlorosulfonated polyolefin and the alkali can be obtained.

As pointed out hereinbefore, if a basic dye is added to a solution of the rubber having a sulfonic acid group or a salt thereof in an organic solvent, the rubber is dyed and a coloring material can be obtained. When the dyeing component is isolated from this coloring material, it retains the elasticity, and thus, when this coloring material is used as an ink, the dyeing component has a sufficient erasability. In order to promote the reaction of the rubber with the dye, it is preferred that the reaction temperature be at least 50° C. and the reaction be carried out with stirring. As the solvent, an aliphatic hydrocarbon such as hexane is used in the case of a sulfonated ethylene/propylene/diene terpolymer, and an aromatic hydrocarbon such as benzene, toluene or xylene or butyl acetate, methyl isobutyl ketone or carbon tetrachloride is used as the main solvent component in the case of a reaction product of chlorosulfonated polyethylene or a chlorosulfonated ethylene/vinyl acetate copolymer with an alkali. Furthermore, a mixed solvent of an organic solvent as mentioned above and a lower alcohol as mentioned above with respect to the reaction product of the chlorosulfonation product with the alkali may be used. The amount of the lower alcohol added may be changed according to the degree of sulfonation of the polymer and can be easily determined according to the dissolution state of the polymer.

The term "basic dye" is used in a broad sense in the instant specification, in that even a cationic dye is included. For example, ordinary triphenylmethane, azo, methine, oxazine and anthraquinone dyes can be used.

The coloring material of the present invention may be used in the form of a reaction liquid obtained at the dyeing step or a solid formed by removing the organic solvent from the reaction liquid by steam distillation, drum drying or reduced pressure drying.

The present invention will now be described in detail with reference to the following examples that by no means limit the scope of the invention.

The amount of the sulfonic acid group in the polymer was determined by dissolving the polymer in tetrahydrofuran containing 10% by weight of ethanol, adding an excessive amount of hydrochloric acid to the solution to change all the sulfonic acid groups to sulfonic acid, pouring the solution into a large quantity of methanol to precipitate the polymer, sufficiently, washing the precipitate with water drying the precipitate, dissolving the precipitate in tetrahydrofuran containing 10% by weight of ethanol again, and carrying out the neutralizing titration with a 0.1N aqueous solution of sodium hydroxide.

EXAMPLE 1

100 g of chlorosulfonated polyethylene (TOSO-CSM-TS-220 supplied by Toyo Soda Mfg. Co.) was dissolved in 525 g of xylene, and the temperature was elevated to 80° C. A solution comprising 5.3 g of sodium hydroxide and 80 g of ethanol was added to the above solution with stirring. Reaction was conducted for 10 hours, the reaction mixture was cooled to room temperature, and 3.5 g of acetic anhydride was then added to effect neutralization. The thus-obtained rubber contained the sulfonic acid group in an amount of $3.7 \times 10^{-4}$ gram-equivalent per gram of the polymer.

Then, 35 g of a cationic dye (Aizen Cathilon Red SGLH supplied by Hodogaya Chemical Co.) was added to the obtained reaction liquid, and dyeing was carried out at 80° C. for 2 hours to obtain 715 g of a coloring material according to the present invention (the polymer concentration was 15% by weight). When a film obtained by drying this solution was immersed in water, dissolution of the dye was not observed.

EXAMPLE 2

100 g of chlorosulfonated polyethylene (TOSO-CSM-TS-530 supplied by Toyo Soda Mfg. Co.) was dissolved in 550 g of carbon tetrachloride, and the temperature was elevated to 80° C. A solution comprising 3.8 g of sodium hydroxide and 80 g of ethanol was added to the solution with stirring. Reaction was conducted for 10 hours, the reaction mixture was cooled to room temperature, and 2.9 g of acetic anhydride was then added to effect neutralization. The obtained rubber contained the sulfonic acid group at a concentration of $2.3 \times 10^{-4}$ gram-equivalent per gram of the polymer.

Then, 22 g of a cationic dye (Aizen Cathilon Blue CD-FRLH supplied by Hodogaya Chemical Co.) was added to the reaction liquid and dyeing was carried out at 80° C. for 2 hours. The solvent was removed from the solution by steam distillation, and the obtained solid was dried to obtain 105 g of a coloring material according to the present invention. When the coloring material was immersed in water, dissolution of the dye was not observed.

APPLICATION EXAMPLE 12 g of each of the coloring material obtained by drying the coloring material solution obtained in Example 1 and the coloring material obtained in Example 2 were dissolved separately in 14 g of xylene and 6 g of ethanol. 12 g of dioctyl phthalate and 2 g of oleic acid were then added to each solution to form ink compositions. Each ink composition was sealed in ball-point pens. Letters or figures written by these ball-point pens could be easily erased by a commercially available eraser and no color remained after the erasure.

For comparison, in the same manner as described above, 12 g of dioctyl phthalate and 2 g of oleic acid were added to a solution of 10 g of chlorosulfonated polyethylene (TOSO-CSM TS-220) and 2 g of Aizen Cathilon Red SGLH in 20 g of xylene to form an ink composition. The ink composition was sealed in a ball-point pen. When it was attempted to erase letters or figures written by this ball-point pen by an eraser, the color was left.

EXAMPLE 3

50 g of an ethylene/propylene/diene terpolymer (JSR EPDM EP-33 supplied by Japan Synthetic Rubber Co.) was dissolved in 800 g of hexane. Acetic anhydride and concentrated sulfuric acid were added to the solution at room temperature with stirring and the reaction was stopped after 30 minutes by the addition of methanol. Then, 14 g of Aizen Cathilon Red SGLH was added to the thus-obtained solution of a rubber having a sulfonic acid group concentration of $3 \times 10^{-4}$ gram-equivalent per gram of the polymer, and dyeing was carried out at 80° C. for 2 hours. A 10% by weight solution of sodium hydroxide in ethanol was then added to effect neutralization, whereby 940 g of a coloring material according to the present invention (the polymer concentration was 6.2% by weight) was obtained. When a film obtained by drying this solution was immersed in water, dissolution of the dye was not observed.

EXAMPLE 4

20 g of a styrene/butadiene rubber (JSR SBR 1507 supplied by Japan Synthetic Rubber) was dissolved in 650 g of dichloroethane. 30 g of a solution of 1.4 ml of sulfur trioxide and 2.2 ml of triethylamine was then added to the above solution with stirring at 10° C. Reaction was conducted for 10 minutes to obtain a solution of a rubber having a sulfonic acid group concentration of $6 \times 10^{-4}$ gram-equivalent per gram of the polymer. Then, 55 g of Aizen Cathilon Blue CD-FRLH and 70 g of methanol were added to the rubber solution, and dyeing was carried out at 80° C. for 2 hours to obtain 790 g of a coloring material according to the present invention (the polymer concentration was 5.2% by weight). When a film obtained by drying this solution was immersed in water, almost no dissolution of the dye was observed.

We claim:

1. An ink providing erasable written letters and figures which comprises a solution of a coloring material in an organic alcoholic solvent mixture,
    said coloring material comprising a rubber having a sulfonic acid group or a salt thereof, which is dyed with a basic dye, said rubber having a mooney viscosity of 20 to 70, and
    said organic alcoholic solvent mixture being a mixture composed of up to 30.0% by weight of an alcohol and the balance of at least one organic solvent selected from the group consisting of toluene, xylene, butyl acetate, methyl isobutyl ketone, and hexane.

2. An ink as set forth in claim 1, wherein said rubber having a sulfonic acid group or a salt thereof is a reaction product of a chlorosulfonated polyolefin with an alkali.

3. An ink as set forth in claim 1, wherein said rubber having a sulfonic acid group or a salt thereof is a sulfonated product of a rubber which is selected from the group consisting of an isoprene rubber, a styrene-butadiene rubber, a butadiene rubber, a nitrile rubber, and an ethylene-propylene rubber.

4. An ink as set forth in claim 1, wherein said alcohol is selected from the group consisting of ethanol, n-propanol, isopropanol, n-bytyl alcohol, sec-butyl alcohol, tertbutyl alocohol, isobutyl alcohol, ethylene glycol, diethylene glycol, propylene glycol, and glycerol.

5. An ink as set forth in claim 1, wherein said rubber having a sulfonic acid group or a salt thereof is selected from the group consisting of a reaction product of chlorosulfonated polyolefin with an alkali, and sulfonated products of an isoprene rubber and nitrile rubber, and
    said organic solvent mixed with an alcohol is at least one solvent selected from the group consisting of toluene, xylene, butyl acetate and methyl isobutyl ketone.

6. An ink as set forth in claim 5, wherein the chlorosulfonated polyolefin is chlorosulfonated polyethylene or chlorosulfonated ethylene/vinyl acetate copolymer.

7. An ink as set forth in claim 1 wherein said rubber having a sulfonic acid group or a salt thereof is a sulfonated ethylene/propylene/diene terpolymer, and said organic solvent mixed with an alcohol is hexane.

8. An ink as set forth in claim 1, wherein the viscosity of said ink is 5 to 100 poises.

9. A process for the preparation of coloring materials, which comprises adding a solution of an alkali in an alcohol to a solution of a chlorosulfonated polyolefin in an organic solvent and then adding a basic dye to the obtained reaction liquid, and optionally removing the solvent from the obtained solution;
    said organic solvent being at least one solvent selected from the group consisting of toluene, xylene, butyl acetate, methyl isobutyl ketone; and the amount of the alcohol being up to 30% by weight, based on the total of the alcohol and the organic solvent, and the amount of the organic solvent being the balance.

10. A process according to claim 9, wherein said alcohol is selected from the group consisting of ethanol, n-propanol, isopropanol, n-butyl alcohol, sec-butyl alcohol, tert-butyl alcohol, isobutyl alcohol, ethylene glycol, diethylene glycol, propylene glycol and glycerol.

11. A process as set forth in claim 9, wherein the alkali is used in an amount of at least two moles per mole of the chlorosulfonic group of the chlorosulfonated polyolefin.

12. A process according to claim 9, wherein the addition of the basic dye is carried out at a temperature of at least 50° C.

13. A process for the preparation of coloring materials, which comprises adding a basic dye to a solution of a sulfonated product of a rubber in an organic solvent to obtain a solution of a coloring material in an organic solvent mixture, and optionally removing the organic solvent mixture from the coloring material solution;
    said organic solvent mixture being a mixture composed of up to 30.0% by weight of an alcohol and the balance of at least one organic solvent selected from the group consisting of toluene, xylene, butyl acetate, methyl isobutyl ketone, and hexane.

14. A process according to claim 13, wherein said alcohol is selected from the group consisting of ethanol, n-proppanol, isopropanol, n-butyl alcohol, sec-butyl alcohol, tertbutyl alcohol, isobutyl alcohol, ethylene glycol, diethylene glycol, propylene glycol, and glycerol.

15. A process according to claim 13, wherein the addition of the basic dye is carried out at a temperature of at least 50° C.

16. A process as set forth in claim 13, wherein said rubber is selected from the group consisting of an isoprene rubber, a styrene-butadiene rubber, a butadiene rubber, a nitrile rubber, and an ethylene-propylene rubber.

* * * * *